United States Patent
Fichter et al.

(10) Patent No.: US 6,685,142 B1
(45) Date of Patent: Feb. 3, 2004

(54) THREE-AXIS POSITION CONTROL FOR LOW-ORBITING SATELLITES

(75) Inventors: Walter Fichter, München (DE); Ernst Brüderle, Ottobrunn (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/583,340

(22) Filed: May 31, 2000

(30) Foreign Application Priority Data

May 31, 1999 (DE) .......................................... 199 24 908

(51) Int. Cl.$^7$ ................................................. B64G 1/36
(52) U.S. Cl. ......................................... 244/171; 244/166
(58) Field of Search ................................ 244/171, 166, 244/169, 165

(56) References Cited

U.S. PATENT DOCUMENTS

| | | | |
|---|---|---|---|
| 3,061,239 A | * | 10/1962 | Rusk |
| 3,429,524 A | * | 2/1969 | Bunkingham et al. |
| 3,489,372 A | * | 1/1970 | Ellis et al. |
| 3,681,583 A | * | 8/1972 | Kubo et al. |
| 3,765,621 A | * | 10/1973 | Shigehara |
| 4,746,085 A | * | 5/1988 | Bruderle |
| 4,807,835 A | * | 2/1989 | Fowler |
| 4,883,244 A | * | 11/1989 | Challoner et al. |
| 5,047,945 A | * | 9/1991 | Paluszek |
| 5,075,693 A | * | 12/1991 | McMillan et al. |
| 5,354,016 A | * | 10/1994 | Goodzeit et al. |
| 5,540,405 A | * | 7/1996 | Bender et al. |
| 5,826,829 A | * | 10/1998 | Holmes |
| 6,113,034 A | * | 9/2000 | Basuthakur et al. |
| 6,131,058 A | * | 10/2000 | Boeinghoff et al. |

OTHER PUBLICATIONS

"Simulations of the Geodynamo: Earth's Innermost Secret". Jan. 12, 2000. Http://www.npaci.edu/online/v4.1/glatz-maier.html.*

Glatzmaier, Gary. "A study by computer simulation of the generation and evolution of the earth's magnetic field." Http://ees5–www.lanl.gov/igpp/earthsmagneticfield.html.*

Glatzmaier, Gary. "Core Convection and the Geodynamo." 1997. http://www.igpp.lanl.gov/geodynamo.html.*

\* cited by examiner

*Primary Examiner*—Tien Dinh
(74) *Attorney, Agent, or Firm*—Kenyon & Kenyon

(57) ABSTRACT

A three-axis attitude control for a low-orbiting satellite. A sensor which measures in two axes is a magnetometer, and a satellite is positioned on an inclined orbit at an inclination angle of approximately 25 degrees to approx. 90 degrees. The satellite has been provided with an overall spin by spin wheels, and actuators generate torque on all three axes of the satellite. Accordingly, this is applicable to three-axis attitude control of a low-orbiting satellite that includes a sensor which measures in two axes and that includes one or several spin wheels.

1 Claim, 2 Drawing Sheets

THREE-AXIS POSITION CONTROL FOR LOW-ORBITING SATELLITES

FIELD OF THE INVENTION

The present invention relates to a three-axis attitude control for a low-orbiting satellite.

BACKGROUND INFORMATION

Satellites in earth orbits frequently need to be controlled in all three attitude movement axes to fulfil the object of their missing. This is for example the case with most communications satellites, which have to be constantly aligned to the earth and in addition must not move in relation to the earth-oriented attitude movement axis.

In the case of earth oriented satellites, usually an earth sensor is used to measure the attitude, with the sensor providing attitude information concerning the roll axis and the pitch axis. To determine the yaw position in addition, usually further sensors are used, in the case of communications satellites, these are mainly sun sensors, magnetometers or speed gyroscopes. The use of an additional sensor has the disadvantage that it increases the costs for attitude control and the complexity of the measuring and control system. Furthermore, the use of an additional sun sensor in the case of low-orbiting satellites has the disadvantage that the earth shadow phase can extend across a region where the sun sensor does not provide any data.

However it is also possible to provide three-axis attitude movement stabilisation for an earth-oriented satellite in accordance with spin wheels in an earth sensor measuring in two axes. As is well known, this takes solace according to the so-called "Whecon method". In this method, a constant spin of the satellite perpendicular to the orbital plane is set by the spin wheels. The spin couples roll and yaw so that the attitude measurement in the roll axis carried out using the earth sensor, also includes attitude information about the yaw axis. By this implicitly present information, the movement of the yaw axis can also be controlled. The Whecon method was invented at the end of the sixties and since then has been in frequent use.

Operational safety of three-axis attitude determination using an earth sensor is affected by the possibility of failure or malfunction of the earth sensor. In the case of total failure of the earth sensor, i.e. if the earth sensor provides no information at all or incorrect information, conventional methods no longer provide the ability for three-axis stabilisation of the satellite position. In the case of limited function of the earth sensor as a result of failure or malfunction of individual sensor components, e.g. by solar or lunar irradiation in one or several detectors of the earth sensor, the earth sensor only provides single-axis attitude information. While this might be adequate for calculating three-axis attitude information, together with the two-axis attitude information of the additional sensor, e.g. a sun sensor or a magnetometer, this would only be the case if the information data of the two sensors has been obtained independently, which ie not usually the case. Through the geometrical attitude, the earth sensor provides single-axis attitude information which is already contained in the two-axis reading of the other sensor. in this case too, it is no longer possible to provide three-axis stabilisation for the satellite.

The requirements of reliability which exist for communication satellites can therefore necessitate a costly redundant design for an earth sensor.

As an alternative, three-axis star sensors can be used for three-axis attitude determination. This option is however very expensive and is therefore not used for communications satellites—in particular in the case of satellite constellations using many satellites.

SUMMARY OF THE INVENTION

It is an object of the present invention to provide an economical and reliable three-axis attitude control for a low-orbiting satellite.

For three-axis attitude regulation the solution according to the present invention only requires a magnetometer measuring in two axes and spin wheels. For the application of the solution according to the present invention, the orbit of the satellite must not he too high, so that there is adequate field intensity of the magnetic field of the earth, and the orbital inclination must clearly be other than zero. These two preconditions are met in the case of low-orbiting satellite constellations used in communications and satellite navigation. Furthermore, satellites on sun-synchronous polar orbits and satellites on inclined eccentric orbits meet these preconditions in the partial region around the perigee.

When compared to an earth sensor measuring in two axes, the use of a magnetometer provides the advantage of increased reliability and an unlimited field of view.

DETAILED DESCRIPTION

The following systems of co-ordinates are used for the explanations below:

Co-ordinatee system fixed in relation to the body. The zero point is in the centre of the satellite. The z-axis points to the earth nominally, i.e. without deviation; the x-axis nominally points to the direction of flight.

Orbit co-ordinates system. The zero point is in the centre of the mass of the satellite. The z-axis points to the centre of the earth; the y-axis is perpendicular to the orbital plane; the x-axis points to the direction of flight in circular orbits.

Inertia co-ordinates system. Inertial geocentric system of co-ordinates, e.g. with an x-axis aligned to the first point of Aries and a z-axis aligned to North.

Figure 1:
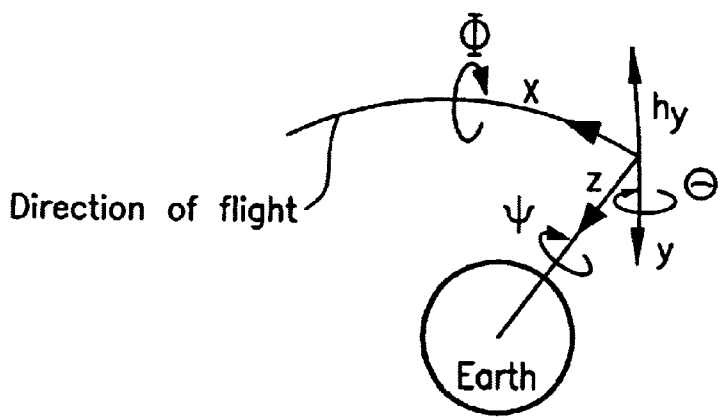
FIG. 1 shows the system of orbit co-ordinates of the solution according to the present invention, with the allocation of attitude excursion and overall spin.

In FIG. 1 the system of orbit co-ordinates on which the present invention is based is shown with the axes x, y and z. The attitude excursions $\Phi$, $\theta$, $\Psi$, associated with these axes are shown with direction of rotation arrows according to FIG. 1. The overall spin of the satellite, according to the present invention, is indicated as a vector $h_y$.

The sensors and actuators listed below are required to carry out the attitude regulation according to the present invention.

A magnetometer providing measurements in two axes, which measures the direction and the strength of the earth's magnetic field;

One or several spin wheels with which a dominant and approximately constant overall spin of the satellite perpendicular to the orbital plane can be established;

Additional actuators by which torques on all three movement axes of the satellite can be applied. This could for example be further spin wheels/reaction wheels or jet engines;

When using spin wheels, additionally further actuators must be present with which external moments can be applied to the satellite to keep the average of the spin wheels in a certain speed range for extended periods.

Figure 2:
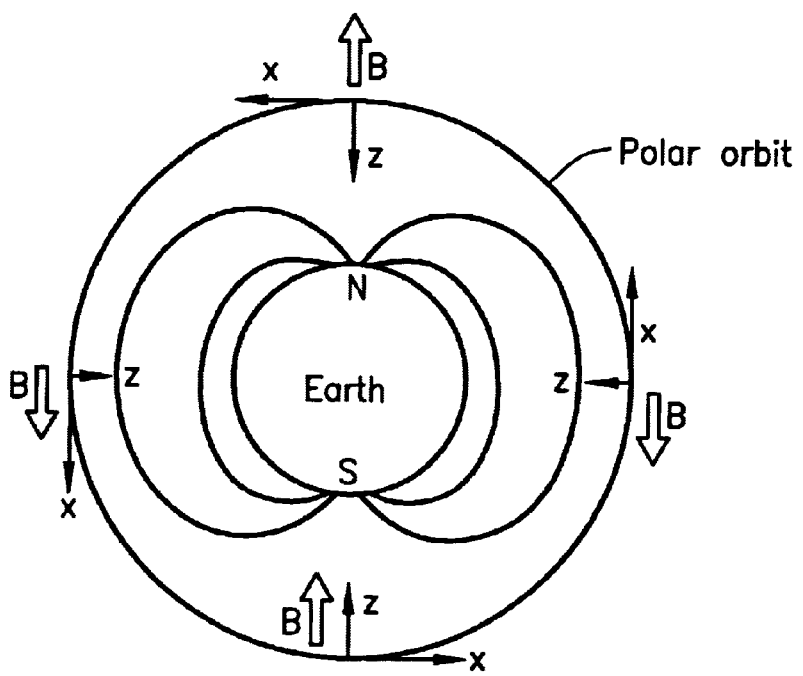
FIG. 2 shows a polar satellite orbit in the earth's magnetic field.

FIG. 2 shows a polar satellite orbit in the magnetic field of the earth with the magnetic field vector B which changes during polar orbit, and the system of co-ordinates fixed in relation to the body.

According to the present invention, read-out processing takes place such that the 3×1 vector supplied by the magnetometer which corresponds to the three components of the magnetic field of the earth, is transformed to the system of co-ordinates fixed in relation to the body, by the installation matrix of the magnetometer. The vector thus transformed is standardised; in this document it is referred to as vector b.

Because of the known position of the satellite, which e.g. can be determined from an orbit model or by a GPS receiver, and a model of the earth's magnetic field, a respective reference vector $b_R$ of the earth's magnetic field can be calculated for the coordinate system fixed in relation to the body. With a magnetometer which provides ideal readings, in the coordinates system fixed in relation to the body, this vector $b_R$ would result after measuring and standardisation it the satellite would exactly maintain its reference position. From the deviation between $b_R$ and b, 2-axis attitude information for the satellite can be obtained. However, it cannot provide the third attitude information, namely information concerning satellite rotation around the reference vector $b_R$. Determination of two-axis attitude information from the deviation of the vectors takes place using the known similar evaluation method in the case of an earth sensor. There is a principal difference between an earth sensor measuring in two axes and a magnetometer measuring in two axes, in that in the case of a magnetometer the respective reference direction in the co-ordinates system fixed in relation to the body moves; but that by contrast the vector $b_R$ which changes with the earth's magnetic field, in the case of an earth sensor is constant at the value (0 0 1).

The two-axis attitude information obtained with the magnetometer can be used for three-axis attitude control of a satellite. To do so, the satellite must have the characteristics of a so-called momentum-bias satellite. The following assumptions are made to describe the particular characteristics of a momentum-bias satellite:

The satellite comprises a spin wheel in the y-axis fixed in relation to the body. This spin wheel generates an almost constant spin in the y-axis of the satellite which essentially determines the overall spin of the satellite.

The satellite attitude around the y-axis is controlled by the spin wheel which is discharged in regular intervals to keep the spin approximately constant.

Along its x and z-axes the satellite is controlled by jets such that the nutation movement is attenuated, i.e. that the inertial rotating speed F expressed in the co-ordinates system fixed in relation to the body, disappears.

Figure 3:
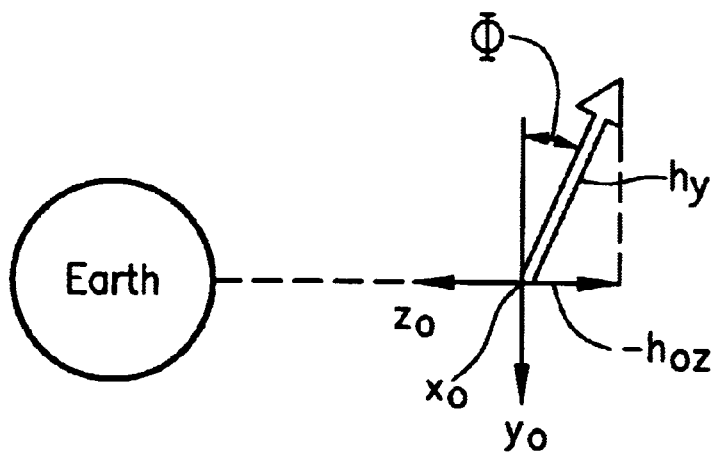
FIG. 3 shows attitude excursions and associated spin components for a moment bias satellite.
Figure 3:
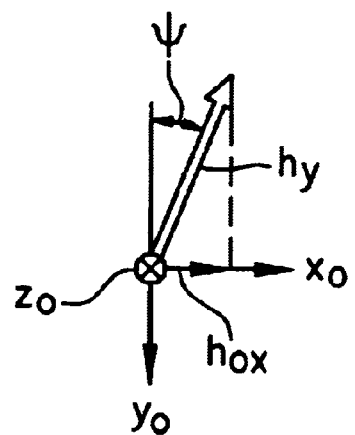

FIG. 3 shows attitude excursion and associated spin components for a momentum bias satellite. $\Phi$, $\Psi$ designate small attitude excursions from the roll axis $x_o$, and yaw axis $z_o$ fixed in relation to the body. The following relations apply to the attitude excursions:

$$\varphi = \frac{-h_{oz}}{h_y}$$

$$\Psi = \frac{h_{ox}}{h_y}$$

with $h_{Ox}$, $h_{Oz}$, describing the x component and the z-component respectively of the overall spin in the system of orbit co-ordinates (o) and $h_y$ describing the wheel spin (which approximately equates to the constant overall spin of the satellite) in the y-axis of the satellite. In a nutation attenuated momentum bias satellite, the x and the z components of the overall spin in the system of orbit co-ordinates thus correspond to the attitude angle in the yaw axis and roll axis.

The yaw angle $\Psi$ and the spin components $h_{ox}$, in the system of orbit co-ordinates cannot be measured. Since the overall spin in the inertial system remains approximately constant, the spin component $h_{ox}$, becomes a spin component $h_{oz}$ after a quarter of the orbit rotation, corresponding to $\phi$, and can thus be measured using the earth sensor. Since the inertial spin remains constant but the inertial direction of measurement changes, as described above, the yaw deviation couples into the roll movement after a certain delay.

The inertial spin of a satellite, depending on its attitude, remains almost constant without any substantial perturbation. To obtain three-axis attitude information using a sensor which measures in two axes, the measurement direction of this sensor moves inertially. In the case of measuring with an earth sensor this is exactly the case: in one orbital revolution, the reference measurement direction of the earth sensor internally rotates by 360 degrees perpendicular to the y-axis of the orbit system. In the case of the magnetometer used according to the present invention, this is also the case as can be seen from the explanation of the earth's magnetic field provided below.

A simple model of the earth's magnetic field in orbit co-ordinates, which model however provides sufficient accuracy for explanation, can be described as follows:

$$\begin{matrix} b_{Rx} \\ b_{Ry} \\ b_{Rz} \end{matrix} = \begin{matrix} -i\sin i\cos\eta \\ \cos i \\ -2\sin i\cos\eta \end{matrix} \quad B_o$$

where $b_{Ri}$ describes the earth's magnetic field components in the system of orbit co-ordinates; i is the inclination of the orbit, $\eta$ the orbit angle and $B_o$ the strength of the earth's magnetic field. In the ideal case this is a polar orbit with an inclination i of 90 degrees, In this case cos i=0 and the reference direction of the earth's magnetic field inertially rotates in the x/z plane at 360 degrees orbit rotation. For smaller Inclinations i it can be seen from the earth's magnetic field stated above that the x and z components disappear (sin i against 0). In this case the direction of the magnetic field $b_R$ and the overall spin of the satellite are almost parallel, i.e. with the solution according to the present invention the attitude of the satellite around the axis of the overall spin cannot be determined due to the missing x and z-spin components. For the relevant case of low-orbiting communications satellites the inclination i is typically 50 degrees and thus sufficiently large.

Below, the process of attitude control using the attitude information determined according to the invention is described. To simplify explanation of the control, it is assumed that the satellite's main moment of inertia in the x and z-axes are identical. Every axis in the x/z plane is thus a main inertia axis. For this case the reference direction $b_R$ of the earth's magnetic field has exactly the same significance as the direction (0 0 1) in an earth sensor, with the only exception that the reference direction $b_R$ moves in the system of orbit co-ordinates and in the coordinates system fixed in relation to the body. The attitude information which cannot be measured directly with the magnetometer comprises a combination of roll angle and yaw angle, corresponding to the vector $b_R$ in the system of orbit co-ordinates.

For control with magnetometer measurements, the time variable direction $b_R$ is treated according to the yaw in the case of an earth sensor, and the time-variable direction perpendicular to $b_R$ in the x/z plane is treated according to the roll axis. In the case of the assumed symmetrical mass distribution, the dynamic relationships do not change. For satellites with unequal mass inertia moments there is no change in the basic feasibility of three-axis attitude control using a magnetometer. For such non-ideal cases what are provided are more refined control approaches which take into account the actual conditions as far as possible.

It should be understood that the satellite may be positioned on an inclined orbit at an inclination angle of, for example, approximately 25 degrees to approximately 90 degrees. It should also be understood that the actuators may include, for example, spin wheels, jets and/or magnet coils.

What is claimed is:

1. A three axis attitude control arrangement for a low-orbiting satellite positioned on an inclined orbit at an inclination of approximately 25 degrees to approximately 90 degrees, comprising:

a sensor corresponding to a magnetometer and for measuring in two axes;

at least one spin wheel for providing the satellite with an overall spin $h_y$; and a plurality of actuators for generating torque on all three axes of the satellite.

* * * * *